E. MANLEY.
WIND AND WATER WHEELS.
No. 188,020. Patented March 6, 1877.
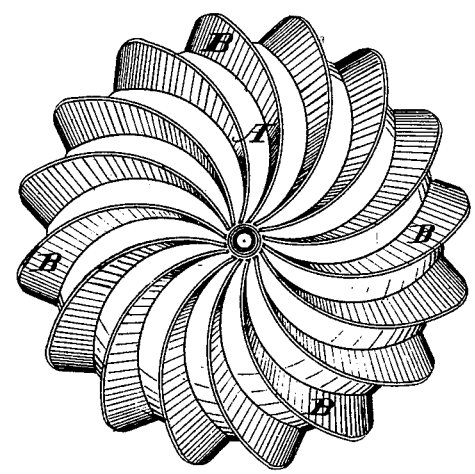
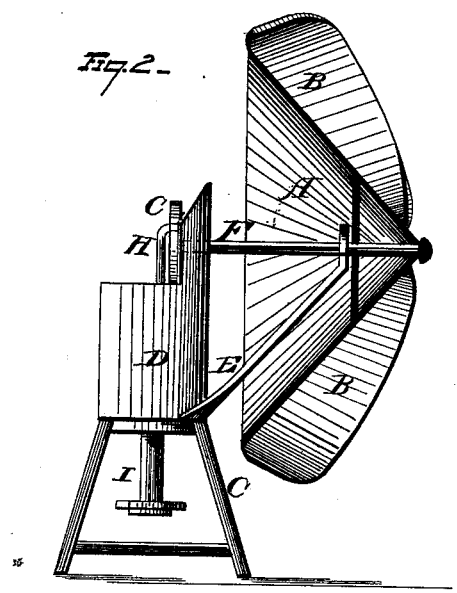
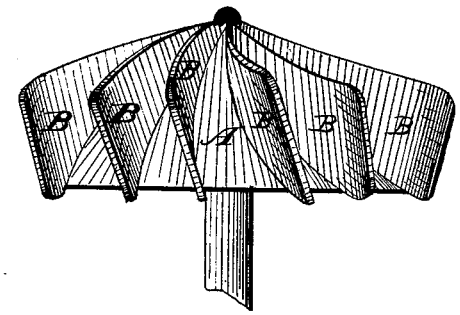

UNITED STATES PATENT OFFICE.

EMMONS MANLEY, OF MARION, NEW YORK, ASSIGNOR OF THREE-FOURTHS OF HIS RIGHT TO W. W. RUNYAN, OF SAME PLACE.

IMPROVEMENT IN WIND AND WATER WHEELS.

Specification forming part of Letters Patent No. 188,020, dated March 6, 1877; application filed October 30, 1876.

*To all whom it may concern:*

Be it known that I, EMMONS MANLEY, of Marion, in the county of Wayne and State of New York, have invented certain new and useful Improvements in Wind and Water Wheels; and I do hereby declare the following to be a full, clear, and exact description of the invention, such as will enable others skilled in the art to which it pertains to make and use it, reference being had to the accompanying drawings, which form part of this specification.

My invention relates to wheels used as power mechanism in mills actuated either by wind or water; and consists in a conical-shaped disk, provided with exterior curved blades or buckets, whereby, upon being subjected indifferently to a current, respectively, of wind or water, the wheel is revolved, carrying its supporting spindle or shaft, which latter connects by suitable means to the device or mechanical apparatus desired to be put into operative action.

In the drawings, Figure 1 is a view of the wheel detached from any mechanism. Fig. 2 is a view, in side elevation, of the same adapted to operate in a windmill. Fig. 3 represents the wheel as applicable to a mill acting as a turbine.

A is a concavo-convex disk of conical shape, and constructed with curved blades or buckets B, secured to the convex side of same, and extending from the projecting center radially outward to the rim or periphery. These blades B are formed of a narrow or reduced part at their inner or central joining with the disk, while they increase in depth as they extend to the outer edge of the disk, somewhat similar to the shape of a wing. On account of the oblique or angularly-curved direction of the blades relative to their supporting-disk, the impelling current is caused to slide or shoot off at a tangent to the disk, and impart at the same time a tendency to a rotary action upon the part of the wheel.

It will be observed that the peculiar coniform construction of the wheel allows of the current striking it first at its projecting center, and there dissolving its force into different lines of action, which, in their resultant power, will cause the wheel to be revolved more easily, and with less waste of force, than I am aware has been the case heretofore. For if the fans or buckets were attached to a supporting-frame which presented itself at a right angle to the current, instead of the obtuse angle herein shown, the current must necessarily expend its initial strength at a disadvantage, and with attendant waste, on account of its meeting a solid resistance in the direct plane of its path—that is, the force is separated into the two lines of action, respectively, one being in a plane parallel to the axis, and the other in a plane parallel with the frame, right angular to the former, so that the force following the first line of action is entirely lost, and the wheel-impelling force is only equal to the force following the second line of action.

By my construction the current of air or water is received by the wheel at an angle approximately one-half greater than that of the old construction, and hence the force which otherwise would be expended in a direct and positive impact against the face of the wheel, and of no economical value whatever, is in this instance caused to strike the disk at a tangent to its plane, and is thus at once dissolved, first into the dead force parallel with the axis, and, secondly, into a subsidiary force, acting obliquely against the blades, and thus tending to revolve the wheel in aid of the usual force, which, under the old form, would take the rotative line of action.

Referring to Fig. 2 of the drawings, C is the tower of a windmill. D is the turn-table, provided with an angular arm, E, to the upper extremities of each of which is journaled in suitable bearings the horizontal crank-shaft F, whose outer or further extremity carries the wheel. G is the crank-disk, which engages with the pitman H, which latter, in turn, reciprocates the plunger or actuating rod I.

As the wheel is presented to the eye of the wind it is revolved, and puts into operation the connecting mechanism. In Fig. 3 is shown the wheel acting as a turbine water-wheel, and mounted upon a vertical shaft, which latter may be carried up through the flume or inner conduit used in connection with the turbine into the mill, where its action may be utilized, as is usual.

In this application of the wheel, the water, led from an inner flume or conduit, is discharged upon the face of the wheel at an obtuse angular inclination to the plane of its fall, and is thence discharged radially outward.

Having fully described my invention, what I claim as new, and desire to secure by Letters Patent, is—

1. The conical wheel, constructed with blades or buckets secured to the outer face of a single hollow disk, and forming the exterior curved plane of the wheel, substantially as described.

2. The combination, with the concavo-convex metallic disk, the convex face formed with a constant plane surface, of tangential blades or buckets secured thereto, and constituting the extreme periphery of the wheel, substantially as described.

In testimony that I claim the foregoing I have hereunto set my hand this 28th day of September, 1876.

- EMMONS MANLEY.

Witnesses:
ARTHUR WESTFALL,
WM. B. CURTIS.